United States Patent Office 3,583,966
Patented June 8, 1971

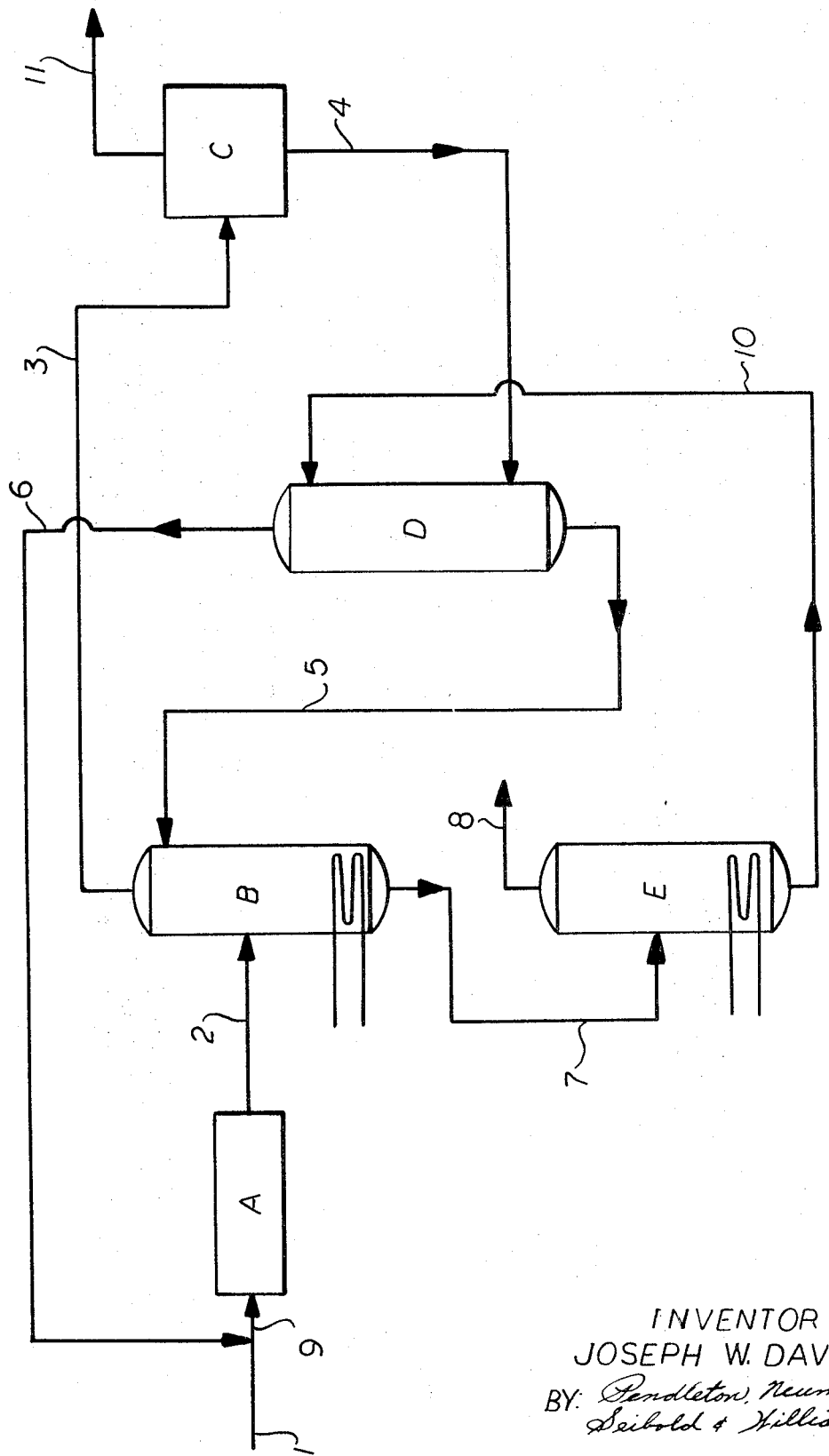

3,583,966
ISOPRENE POLYMERIZATION
Joseph W. Davison, Bartlesville, Okla., assignor to
Phillips Petroleum Company
Filed Jan. 6, 1969, Ser. No. 789,286
Int. Cl. C08d 3/04; C08f 3/16
U.S. Cl. 260—94.2                           1 Claim

ABSTRACT OF THE DISCLOSURE

Isoamylenes are passed through a dehydrogenation reactor and the resulting mixture of isoprene and isoamylenes passed to extractive distillation for removal of acetylenes, cyclopentadiene, piperylenes, and other isoprene polymerization catalyst poisons. The poison-free overhead from the extractive distillation unit is passed to a polymerization reactor for production of cis-polyisoprene. Isoamylenes together with unreacted isoprene are recovered from the polymerization effluent and passed to a liquid-liquid extractor from which the raffinate containing isoamylenes is recycled to dehydrogenation and the rich solvent containing isoprene is passed as the only solvent to the extractive distillation unit. Rich solvent from the latter is stripped to reject catalyst poisons and the lean solvent passed to the extractor. The extractive distillation and liquid extraction steps are thus made more economical by using the same solvent in both and by absorbing only the minor components in the solvent.

---

This invention relates to a process for producing polyisoprene and has for an object the provision of an economical process for preparing a feed stock and a recycle stock suitable for use in a polyisoprene polymerization procedure.

It is known that isoprene may be readily polymerized to cis-polyisoprene to form a substitute for natural rubber. The reason cis-polyisoprene has not replaced natural rubber is because it is more expensive and the high price resides largely in the cost of purifying the isoprene by extraction and extractive distillation. In order to make high purity isoprene (i.e., 99+ percent), it is necessary to dissolve the isoprene in a selective solvent and then to strip and recycle the solvent. Since the solvent will only dissolve about 20 percent isoprene and because the extractor and the extractive distillation units must operate with a reflux ratio of 10 or higher, it is necessary to recycle to the extraction units from 25 to 50 volumes of solvent per volume of high purity isoprene recovered.

It has recently become known that polyisoprene can be prepared from a charge stock containing a relatviely low concentration isoprene in a solvent such as one of the isoamylenes. One difficulty with using low concentration isoprene in such procedures is that complete conversion of the isoprene is not obtained in the polymerization system and it is, therefore, necessary to recycle the unconverted isoprene and, at some point in the overall plant, to separate isoamylenes from the isoprene.

A further object of this invention is to provide a process in which unconverted isoprene from the polymerization process is separated from the isoamylenes for recycle to the polymerization step and the isoamylenes free of isoprene are charged back to the dehydrogenation system for additional isoprene production.

A further object of this invention is to provide a process of removing from the polymerization feed stock those catalyst poisons which are incident to the production of isoprene in the isoamylenes dehydrogenation step.

A still further object of this invention is the provision of a process in which only the minor components are dissolved in the selective solvent in the extraction purification steps whereby the volume of recycle solvent may be considerably reduced with attendant economies in operation.

Further and additional objects will appear from the following description, the accompanying drawing and the appended claim.

In accordance with one embodiment of this invention, a stream of hydrocarbons comprising essentially of isoamylenes (e.g., 3 - methylbutene - 1, 2 - methylbutene - 1, 2-methylbutene-2, or mixtures thereof) is charged through a dehydrogenation zone in which a substantial portion of the isoamylenes is converted to isoprene. The effluent from the dehydrogenator comprises essentially a mixture of isoprene and unconverted isoamylenes together with $C_4$ to $C_5$ acetylenes, piperylenes and cyclopentadienes which latter have been found to be posisons for the isoprene polymerization catalyst. The mixture from the dehydrogenator is flowed to an extractive distillation zone to which is also charged a liquid which is a selective solvent for acetylenes and other polymerization catalyst poisons. The overhead from the extractive distillation zone is passed directly to the isopene polymerization step from which the desired product is obtained. The isoamylenes effluent from the polymerization step containing some unreacted isoprene is charged to a liquid-liquid extractor to which is also charged a solvent which is preferential for isoprene. The raffinate being a stream containing undissolved isoamylenes essentially free of isoprene is recycled to the dehydrogenator and the enriched solvent stream containing the isoprene is cycled as the only solvent stream to the above referred to extractive distillation zone. The bottoms from the distillation zone comprising the solvent, the dissolved catalyst poisons (i.e., $C_4$ to $C_5$ acetylenes, piperylenes and cyclopentadiene) and a relatively small amount of isoprene is passed to a stripper in which the volatile components including the catalyst poisons are separated and the lean solvent is recycled to the liquid-liquid extractor.

An important feature of this invention resides in the use of the preferential solvent to remove the unreacted isoprene normally contained in the isoamylenes effluent from the isoprene polymerization unit wherein the solvent containing isoprene is cycled to the extractive distillation zone as the only solvent required for that operation and the weight ratio of recycle solvent to the isoprene passing overhead is only about 0.5 to about 3, whereby to obtain the desired economies in solvent handling. Generally speaking, the amount of catalyst poison in the charge stock to the extractive distillation zone is between about 0.1 and 10 percent by weight and within these limits this process is useful for removing these poisons and obtaining good efficiencies in the overall polymerization procedure. Typically the ratio of isoprene to amylenes in the charge to polymerization zone may be about 50/50. However, the relative weight ratio of these ingredients may be within the range of from about 1-to-5 and about 2-to-1. A further characteristic of a typical operation in accordance with this invention is one in which the isoprene content of the nonpolymer effluent from the polymerization zone is less than about 15 percent by weight which permits the employment of low solvent rates for the removal of isoprene from the isoamylenes in the liquid-liquid extractor. Such removal should be complete before the isoamylenes are recycled to the dehydrogenation zone.

The selective solvent used in accordance with this invention may be any one of those already known to be suitable for use in separating mono-olefins (such as isoamylenes) from diolefins and diolefins from acetylenes, cyclopentadienes, etc. Suitable solvents include sulfolane, furfural, methyl Carbitol, ethyl Carbitol, acetonitrile, ethylenediamine, alkylene carbonates, lactones, ethylene glycol, diethylene glycol and the like or mixtures thereof.

A particular solvent useful for the purpose is a methyl Carbitol-sulfolane mixture. This invention is not limited to the use of any particular form of apparatus or to any specific processing conditions for the dehydrogenator, the extractive distillation column, the polymerization zone, the liquid-liquid extractor or the stripper, as will be apparent to one skilled in the art. These conditions and equipment may be varied depending on various factors, including the composition of the solvent, the catalysts involved, the composition of the various streams in the process and the like.

For a more complete understanding of this invention, reference will now be made to the accompanying drawing which shows in flow diagram form the various elements that are used in carrying out the process and the flow of fluid from one to the other. With particular reference to the drawing, the basic equipment units comprise an isoamylenes dehydrogenating reactor A and extractive distillation column B, an isoprene polymerization reactor C, a liquid-liquid extractor D, and a solvent stripper E. In operation, a feed stock comprising essentially isoamylenes (e.g., 2-methylbutene-2, 2-methylbutene-1, 3-methyl-butene-1 or mixtures thereof) is introduced to the system through conduit 1. This feed stock may be obtained, for example, by the acid extraction of catalytically cracked gasoline, as described in U.S. Pat. No. 3,185,742, and the dehydrogenation conditions may be essentially those set forth in U.S. Pat. No. 3,321,542. The dehydrogenated product consisting essentially of unreacted isoamylenes, isoprene and between about 0.1 and 10 weight percent of polymerization catalyst poisons such as dimethyl acetylene, valylene, piperylenes and cyclopentadiene, is charged through conduit 2 to the extractive distillation column B. An isoprene enriched solvent such as furfural is introduced into the top of the column through conduit 5 and the weight ratio of said solvent to isoprene carried overhead through conduit 3 is preferably between 0.5 and 3. Under these conditions the aforementioned catalyst poisons and a small proportion of the isoprene are separated with the solvent as bottoms through conduit 7. The overhead passing through line 3 consists essentially of a mixture of isoprene and isoamylenes in the weight ratio range of between about 2-to-1 and 1-to-5, suitably 1-to-1. Typically the distillation column B can be operated with a top temperature of 0 to 150° F. and a bottom temperature of 175 to 325° F.

The overhead stream is passed through conduit 3 to the isoprene polymerization zone C which may suitably use a lithium catalyst such as 3-bromophenyllithium as described in U.S. Pat. No. 3,215,679. Polymerization zone C is maintained at a temperature ranging from about −20 to about 100° C. The polymerization product is conventionally processed for the separation of polymer from the isoamylenes as, for example, by steam stripping and the product is removed from the system through line 11. The recovered isoamylenes containing a small amount of unconverted isoprene (up to about 15 weight percent) is passed through conduit 4 to the liquid-liquid extractor D. To the opposite end of the extractor D is added a stream of lean solvent through conduit 10. The conditions in the extractor are such that a stream consisting essentially of isoamylenes is discharged as raffinate through line 6 and combined with the feed stock in conduit 1 for recycle through conduit 9 to the dehydrogenator A. The solvent absorbs the isoprene in the extractor and the enriched solvent is passed through conduit 5 as selective solvent for the extractive distillation occurring in column B. The extractor D is suitably operated at 80 to 200° F.

The bottoms from the distillation column B are passed through conduit 7 to a stripper E in which the catalyst poisons are removed overhead through an exhaust conduit 8. The lean stripped solvent is then recycled through conduit 10 to the extractor D. Suitably the stripper can be operated with a top temperature of 160 to 185° F., a bottom temperature of 200 to 350° F., and a pressure of 40 to 75 p.s.i.a.

A material balance is set forth in Table I to further illustrate the objects and advantages of this invention. The numerals at the head of each column in the table correspond to the numbers of the various stream conduits shown in the drawing.

TABLE I.— MATERIAL BALANCE (COMPOSITION OF SEVERAL STREAMS EXPRESSED IN POUNDS PER HOUR)

| Component | Feed 1 | Recycle 6 | Feed plus recycle 9 | Dehydro effluent 2 | Polymer feed 3 | Polymer recycle 4 | Reflux solvent 5 | Stripper overhead 8 | Bottoms 7 | Solvent recycle 10 | Product 11 |
|---|---|---|---|---|---|---|---|---|---|---|---|
| 3-methylbutene-1 | 2 | 5 | 7 | 5 | 5 | 5 | 0 | 0 | 0 | 0 | 0 |
| 2-methylbutene-1 | 1 | 1 | 2 | 1 | 1 | 1 | 0 | 0 | 0 | 0 | 0 |
| 2-methylbutene-2 | 466 | 460 | 926 | 460 | 480 | 480 | 20 | 0 | 0 | 0 | 0 |
| Pentene-1 | 4 | 4 | 8 | 4 | 4 | 4 | 0 | 0 | 0 | 0 | 0 |
| Cis-pentene-2 | 23 | 16 | 39 | 18 | 18 | 18 | 2 | 2 | 2 | 0 | 0 |
| Trans-pentene-2 | 11 | 7 | 18 | 8 | 8 | 8 | 1 | 1 | 1 | 0 | 0 |
| Isoprene | 0 | 0 | 0 | 444 | 479 | 55 | 55 | 20 | 20 | 0 | 0 |
| Dimethyl acetylene | 0 | 0 | 0 | 23 | 0 | 0 | 0 | 23 | 23 | 0 | 0 |
| Valylene | 0 | 0 | 0 | 4 | 0 | 0 | 0 | 4 | 4 | 0 | 0 |
| Piperylenes | 0 | 0 | 0 | 18 | 0 | 0 | 0 | 18 | 18 | 0 | 0 |
| Cyclopentadiene | 0 | 0 | 0 | 15 | 0 | 0 | 0 | 15 | 15 | 0 | 0 |
| Solvent | 0 | 0 | 0 | 0 | 0 | 0 | 550 | 0 | 550 | 550 | 0 |
| Polyisoprene | 0 | 0 | 0 | 0 | 0 | 0 | 0 | 0 | 0 | 0 | 424 |
| Total, lbs./hr | 507 | 493 | 1,000 | 1,000 | 995 | 571 | 628 | 83 | 638 | 550 | 424 |

It will be apparent that various modifications and changes in the operating conditions may be made without departing from the spirit and scope of the appended claim.

What is claimed is:

1. A process of preparing polyisoprene which comprises the steps of:
   (a) charging a first stream of isoamylenes to a dehydrogenation zone;
   (b) withdrawing as the reaction product from said dehydrogenating zone a second stream comprising major amounts of isoprene and isoamylenes and up to about 10 percent by weight an isoprene polymerization catalyst poison selected from the group consisting of $C_4$ to $C_5$ acetylenes, piperylenes, cyclopentadiene, and mixtures thereof;
   (c) charging the second stream to an extractive distillation zone;
   (d) withdrawing a third stream comprising essentially isoprene and at least 25 percent by weight of isoamylenes as overhead from said distillation zone;
   (e) charging said third stream to a lithium catalyzed isoprene polymerization zone;
   (f) withdrawing a fourth stream comprising essentially isoamylenes and up to about 15 percent by weight of unreacted isoprene from said polymerization zone;
   (g) charging said fourth stream and a liquid preferential solvent for hydrocarbon acetylenes and dienes into a liquid-liquid extraction zone;
   (h) withdrawing a fifth stream comprising essentially isoamylenes from said extraction zone for recycle to said dehydrogenation zone;

(i) separately withdrawing a sixth stream comprising a major weight proportion of said solvent and a minor weight proportion of isoprene from said extraction zone;

(j) charging said sixth stream as selective solvent to said distillation zone, the weight ratio (i) of solvent charged to and (ii) of isoprene withdrawn in said third stream from said distillation zone being less than about 3;

(k) withdrawing as bottoms from said distillation zone a seventh stream comprising essentially said solvent having said catalyst poison and a minor proportion of isoprene dissolved therein;

(l) charging said seventh stream to a stripping zone to separate dissolved catalyst poison from said solvent;

(m) charging lean stripped solvent from said stripping zone as at least a portion of said liquid charged to the extraction zone; and (n) withdrawing the desired polyisoprene product from said polymerization zone.

References Cited

UNITED STATES PATENTS

| | | | |
|---|---|---|---|
| 2,813,141 | 11/1957 | Mathis et al. | 260—683.3 |
| 3,059,037 | 10/1962 | Cahn | 260—674 |
| 3,235,471 | 2/1966 | Clay | 203—54 |
| 3,296,241 | 1/1967 | Berger | 260—94.2 |

JOSEPH L. SCHOFER, Primary Examiner

W. F. HAMROCK, Assistant Examiner

U.S. Cl. X.R.

260—677